United States Patent
Wu et al.

(10) Patent No.: US 7,222,266 B2
(45) Date of Patent: May 22, 2007

(54) ERROR-EXAMINING METHOD FOR MONITOR CIRCUIT

(75) Inventors: Yi-Chang Wu, Taipei Hsien (TW); Yi-Hsun Chen, Taipei Hsien (TW); Sen-Ta Chan, Taipei Hsien (TW)

(73) Assignee: Wistron Corporation, Hsi-Chih, Taipei Hsien (TW)

( * ) Notice: Subject to any disclaimer, the term of this patent is extended or adjusted under 35 U.S.C. 154(b) by 433 days.

(21) Appl. No.: 10/709,052

(22) Filed: Apr. 8, 2004

(65) Prior Publication Data

US 2005/0160323 A1    Jul. 21, 2005

(30) Foreign Application Priority Data

Dec. 26, 2003    (TW) .............................. 92137016 A

(51) Int. Cl.
*G06F 11/00*    (2006.01)
(52) U.S. Cl. .................... 714/39; 702/99; 702/104
(58) Field of Classification Search ................ 714/39; 702/99, 104; 374/1
See application file for complete search history.

(56) References Cited

U.S. PATENT DOCUMENTS

| | | | |
|---|---|---|---|
| 6,161,958 A * | 12/2000 | Rattman et al. | 374/1 |
| 6,598,195 B1 * | 7/2003 | Adibhatla et al. | 714/745 |
| 6,774,653 B2 * | 8/2004 | Gold et al. | 324/760 |
| 6,804,600 B1 * | 10/2004 | Uluyol et al. | 701/100 |
| 2003/0012254 A1 * | 1/2003 | Park et al. | 374/45 |
| 2006/0162419 A1 * | 7/2006 | Rosskopf | 73/1.59 |

* cited by examiner

*Primary Examiner*—Michael Maskulinski
(74) *Attorney, Agent, or Firm*—Winston Hsu

(57) ABSTRACT

A monitor circuit has a first detection module for detecting an input signal and for generating a first examining signal according to the input signal, a second detection module electrically connected to the first detection module for generating an output signal according to the first examining signal, and a control unit electrically connected to the first and the second detection modules selectively for controlling the second detection module to generate the output signal according to the first examining signal, for controlling the first detection module to monitor the output and to generate a second examining signal, or for comparing the first examining signal with the second examining signal so as to determine if the monitor circuit is functioning normally.

15 Claims, 4 Drawing Sheets

ERROR-EXAMINING METHOD FOR MONITOR CIRCUIT

BACKGROUND OF INVENTION

1. Field of the Invention

The present invention relates to a monitor circuit, and more particularly, to a method for examining if the monitor circuit is functioning normally and related monitor circuit.

2. Description of the Prior Art

For the last decade, central processing units (CPUs) have gained impressive progress and are capable of operating at high speeds. Operating a high-speed CPU generates great heat. Such heat usually impacts the efficiency of the CPU. Therefore, how to monitor the heat generated by an operating CPU effectively and how to reduce the temperature around the CPU are becoming popular issues in the information industry.

In general, a PC health monitor circuit is used for monitoring a CPU or even a variety of environment factors, such as temperature, voltage and fan speed, inside a computer system, and for controlling the operation of the electronic components including the CPU of the computer system according to the monitored environment factors.

That a monitor circuit is capable of monitoring and controlling the operation of a computer system, as described above, is under an assumption that the monitor circuit is always functioning normally. Occasionally, if the monitor circuit is in reality damaged and is still monitoring the computer system, the computer system is probably wrongly controlled by the monitor circuit and is susceptible to being damaged.

SUMMARY OF INVENTION

It is therefore a primary objective of the claimed invention to provide a monitor circuit with self-error-examining capability and detecting circuit error method to overcome the drawbacks of the prior art.

According to the claimed invention, the monitor circuit has a first detection module for detecting an input signal and for generating a first examining signal according to the input signal, a second detection module electrically connected to the first detection module for generating an output signal according to the first examining signal, and a control unit electrically connected to the first and the second detection modules selectively for controlling the second detection module to generate the output signal according to the first examining signal, for controlling the first detection module to monitor the output and to generate a second examining signal, or for comparing the first examining signal with the second examining signal so as to determine if the monitor circuit is functioning normally.

It is an advantage of the claimed invention that the monitor circuit has the self-error-examining capability and will have itself checked from time to time, so as to prevent a situation in which the monitor circuit is damaged and still wrongly controls a computer system.

These and other objectives of the claimed invention will no doubt become obvious to those of ordinary skill in the art after reading the following detailed description of the preferred embodiment that is illustrated in the various figures and drawings.

DETAILED DESCRIPTION

Figure 1:
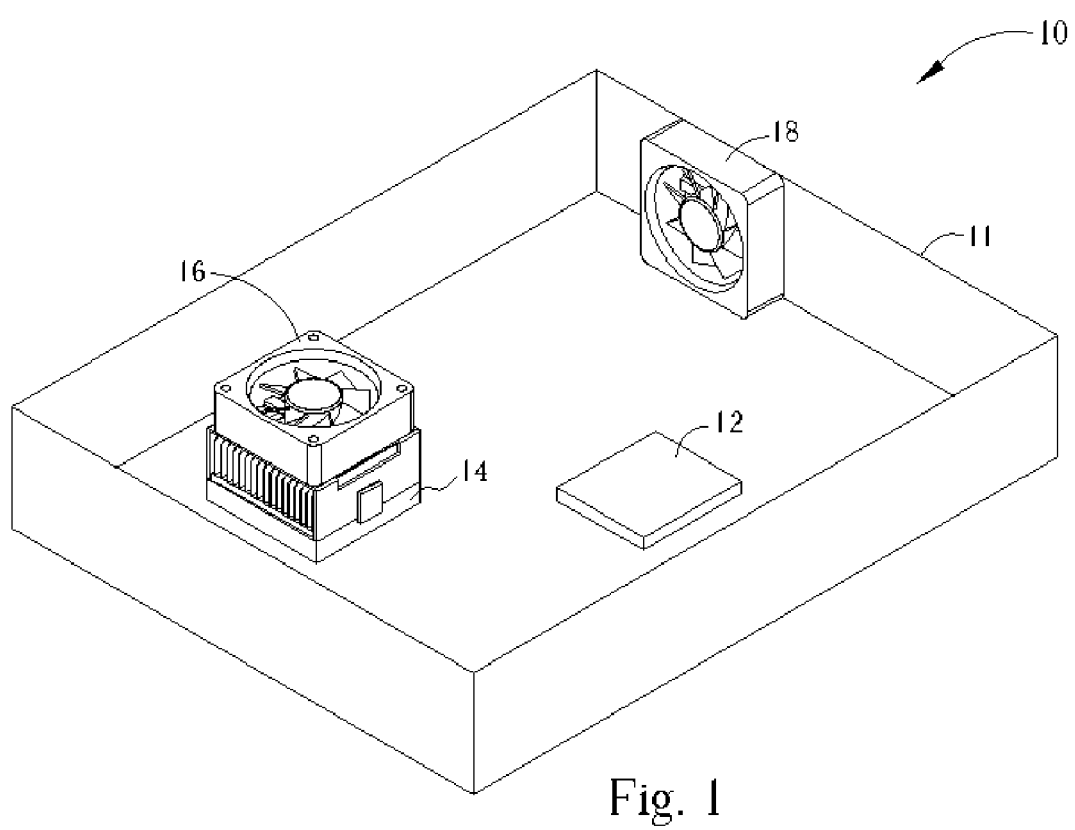
FIG. 1 is schematic diagram of a computer system of the preferred embodiment according to the present invention.

Please refer to FIG. 1, which is a schematic diagram of a computer system 10 of the preferred embodiment according to the present invention. The computer system 10 comprises a monitor circuit 12 for monitoring a variety of environment factors, such as temperature, operating voltages and fan speed, in the computer system 10. The computer system 10 further comprises a housing 11, a CPU 14 installed inside the housing 11 for processing data, a CPU fan 16 mounted on the CPU 14 for ventilating heat generated by the CPU 14, and a system fan 18 for ventilating heat generated by electronic components of the computer system 10 including the CPU 14 to a region outside of the housing 11.

Figure 2:
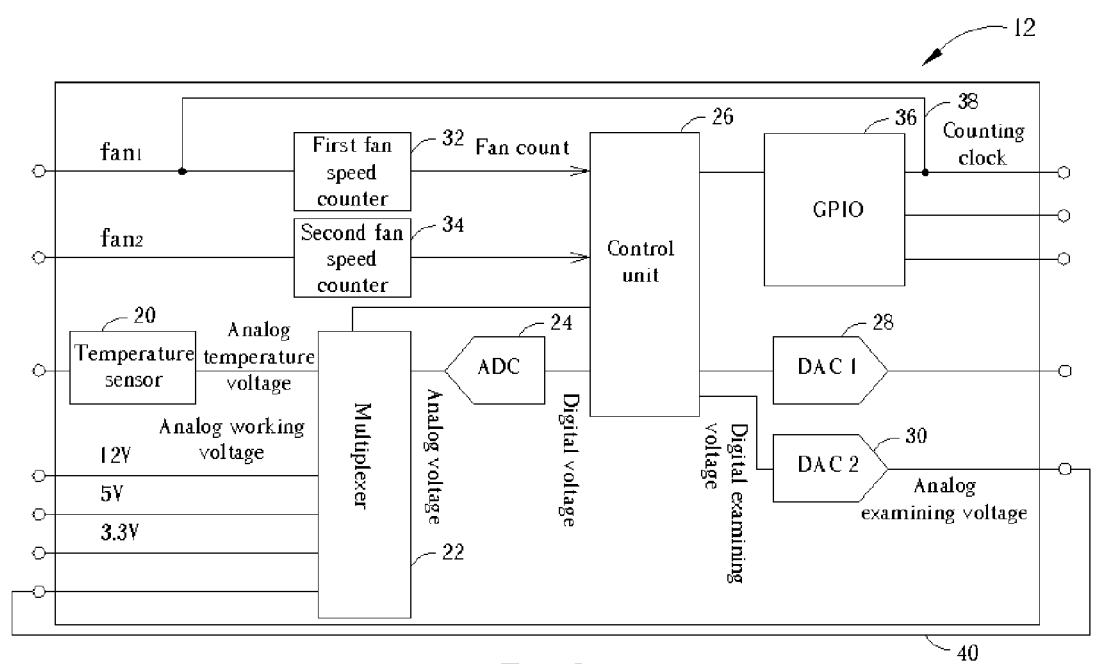
FIG. 2 is a function block diagram of a monitor circuit of the computer system shown in FIG. 1 according to the present invention.

Please refer to FIG. 2, which is a function block diagram of the monitor circuit 12. The monitor circuit 12 comprises a temperature sensor 20 for sensing the temperature of the CPU 14 and for generating an analog temperature voltage, a multiplexer 22 for selecting and outputting one of a plurality of analog temperature voltages including the analog temperature voltage generated by the temperature sensor 20, an analog to digital converter (ADC) 24 electrically connected to the multiplexer 22 for transforming an analog voltage output from the multiplexer 22 to a digital voltage, a control unit 26 electrically connected to the ADC 24 for outputting a digital control signal according to a digital voltage output from the ADC 24, first and second digital to analog converters (DAC) 28 and 30 both electrically connected to the control unit 26 for transforming a digital control signal output from the control unit 26 into an analog control signal, first and second fan speed counters 32 and 34 both electrically connected to the control unit 26 for counting the number of a first and a second fan counts included in a first and a second counting clocks respectively generated by the CPU fan 16 and by the system fan 18, and a general purpose input/output (GPIO) module 36 electrically connected to the control unit 26 and capable of outputting a counting clock.

The temperature sensor 20 of the preferred embodiment directly contacts the die of the CPU 14 so as to sense the temperature of the CPU 14 as accurately as possible. Moreover, the analog voltages that the multiplexer 22 receives include a plurality of working voltages, such as 3.3V, 5V and 12V, in addition to the analog temperature voltage generated by the temperature sensor 20.

How the monitor circuit 12 monitors the computer system 10 is described as follows. The temperature sensor 20 senses the temperature of the CPU 14 and generates an analog temperature voltage. The control unit 26 controls the multiplexer 20 to select and output one of a plurality of analog voltages consisting of the analog working voltages (3.3V, 5V and 12V) and the analog temperature voltage generated by the temperature sensor 20 to the ADC 24. If what the multiplexer 22 outputs to the ADC 24 is an analog working voltage, for example 3.3V, the ADC 24 transforms the analog working voltage (3.3V) to a digital working voltage (3.3V), and the control unit 26 compares the digital working voltage (3.3V) with a predetermined signal (3.3V) and reports that the computer system 10 is functioning abnormally when the digital working voltage is larger or smaller than the predetermined signal (3.3V) by a predetermined tolerance. Both the predetermined signal and the predetermined tolerance can be set by software.

For example, if the computer system 10 has a high accuracy demand for the working voltages of electronic components of the computer system 10 and the software sets the predetermined tolerance as small as 1%, the monitor circuit 12 reports that the computer system 10 is functioning abnormally whenever detecting that a difference between the digital working voltage (3.3V) and the predetermined signal (3.3V) exceeds 1%. On the contrary, if the computer system 10 has only a low accuracy demand, the software can set the predetermined tolerance of 10% instead of such a high accuracy demand of 1%. If the analog voltage that the multiplexer 22 outputs to the ADC 24 is an analog temperature voltage generated by the temperature sensor 20, the ADC 24 transforms the analog temperature voltage into a digital temperature voltage, and the control unit 26 compares the digital temperature voltage with the first fan count output from the first fan speed counter 32 (or with the second fan count output from the second fan speed counter 34) and controls the GPIO 36 to output a crystal wave of a predetermined frequency for the first DAC 28 (or the second DAC 30) to output a variety of voltage signals, so as to adjust the operation of the processor fan 16 (or the system fan 18). For example, if the control unit 26 compares that the digital temperature voltage is still lower than a temperature voltage lower limit, implying that the temperature of the die of the CPU 14 is still low, the control unit 26 can control the GPIO 36 to output an analog control signal such as a pulse width modulation signal or can control the first DAC 28 to output a variety of voltage signals of a variety of frequencies, so as to reduce the CPU fan to have the fan speed lower than the first fan speed. For example, if a voltage signal that the first DAC 28 outputs has a voltage level of 12V and the CPU fan 16 has a fan speed of 6000 rotations per second, the first DAC 28 can alternatively output a voltage signal having a voltage level of 10V only to control the CPU fan 16 to have the fan speed reduced to 5000 rotations per second. On the contrary, if the digital temperature voltage that the control unit 26 detects is higher than a temperature voltage upper limit, implying that the die of the CPU 14 has a temperature high enough to impact the operation of the CPU 14, the control unit 26 can increase the fan speed of the CPU 16 with the GPIO 36 or with the first DAC 28, or can output a control signal to simply shut down the CPU 14.

As mentioned previously, the monitor circuit of the prior art is likely still monitoring and wrongly controlling the operation of a computer system without knowing that it has been damaged. The monitor circuit 12 of the present invention does not have the drawback. Please refer to FIG. 2 again. The monitor circuit 12 further comprises a first conduction line 38 connected between an output end of the GPIO 36 and an input end of the first fan speed counter 32, and a second conduction line 40 connected between an output end of the second DAC 30 and an input end of the multiplexer 22. The monitor circuit 12 is capable of outputting a first digital examining voltage actively to the second DAC 30 and of controlling the multiplexer 22 to transfer a first analog examining voltage transferred over the second conduction line 40 and transformed from the first digital examining voltage by the second DAC 30 to the ADC 24. Then the control unit 26 compares the first digital examining voltage with a second digital examining voltage transformed from the first analog examining voltage by the ADC 24 and determines if the monitor circuit 12 is functioning normally. Alternatively, the control unit 26 of the monitor circuit 12 is capable of actively controlling the GPIO 36 to output a third counting clock to the input end of the first fan speed counter 32 according to a third fan count. The control unit 26 compares the third fan count with a fourth fan count generated by the first fan speed count 32 by counting the third counting clock and determines if the monitor circuit 12 is functioning normally.

Figure 3:
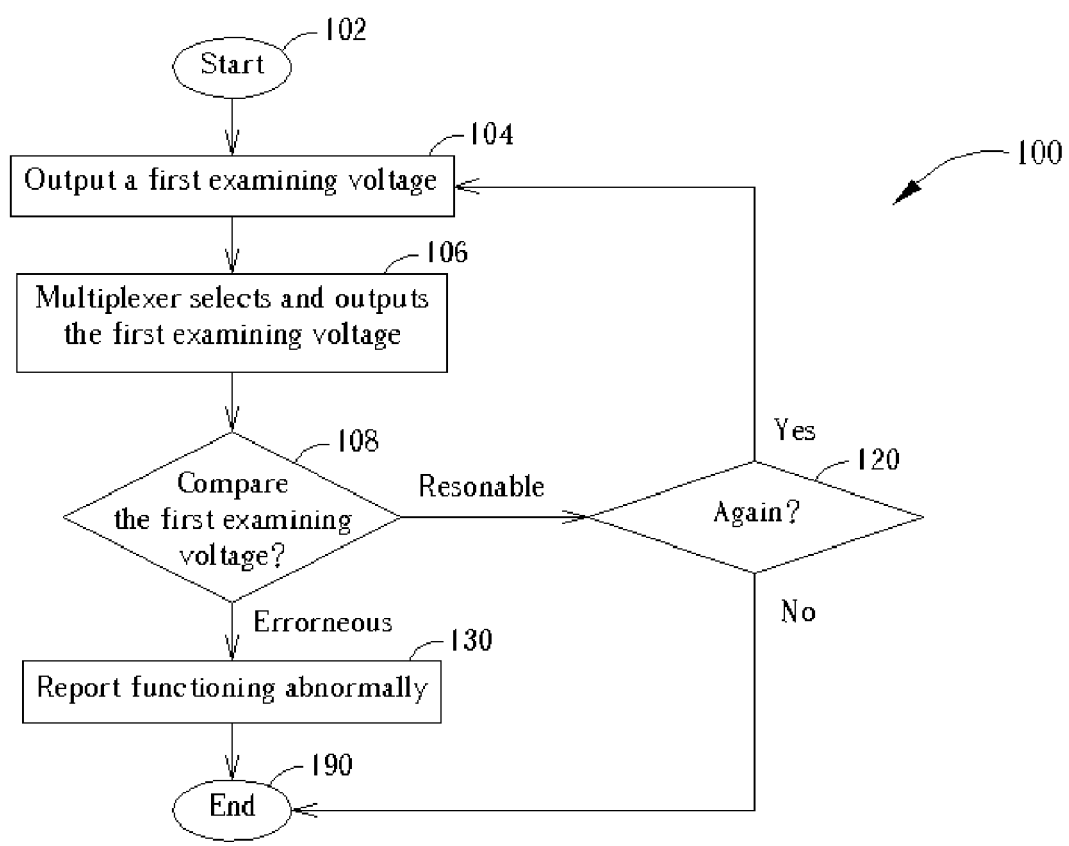
FIG. 3 is a flowchart of a method demonstrating how to examine if the monitor circuit shown in FIG. 2 is functioning normally according to the present invention.
Figure 4:
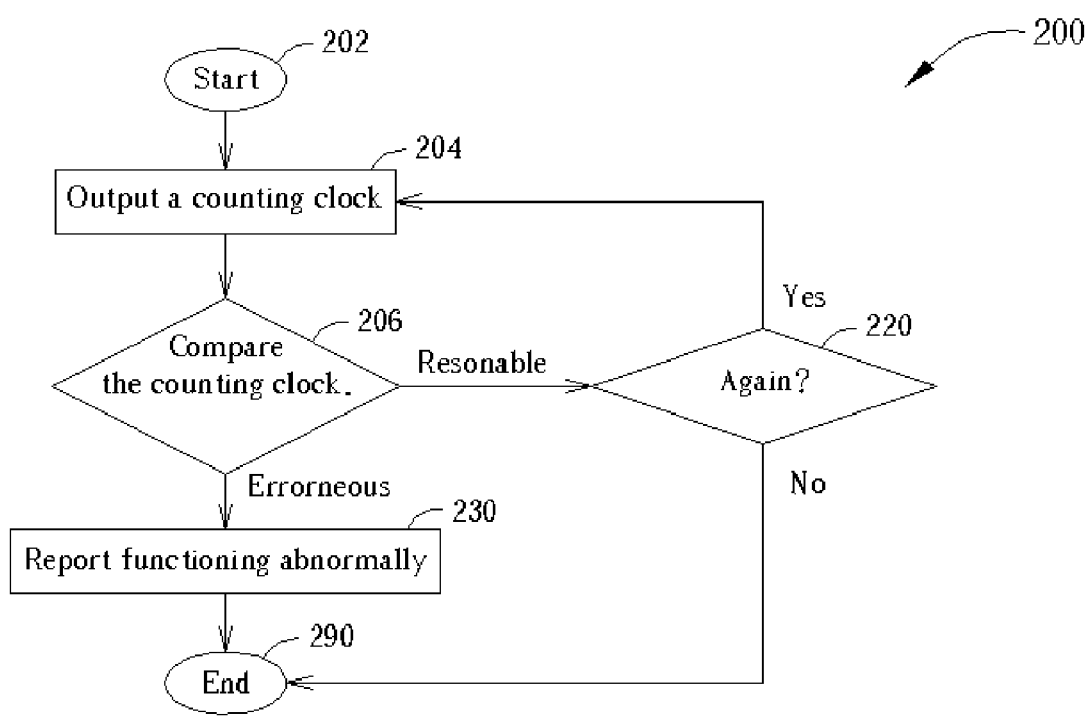
FIG. 4 is a flowchart of another method demonstrating how to examine if the monitor circuit shown in FIG. 2 is functioning normally according to the present invention.

In order to describe in detail that the monitor circuit 12 of the present invention has the self-error-examining capability, please refer to FIG. 3 and FIG. 4, which are two flowcharts of a first method 100 and a second method 200 according to the present invention. The first method 100 comprises the following steps:

Step 102: Start;

Step 104: The control unit 26 outputs a first digital examining voltage to the second DAC 30; (The second DAC 30 transforms the first digital examining voltage into a first analog examining voltage and transfers the first analog examining voltage to the input end of the multiplexer 22.)

Step 106: The control unit 26 controls the multiplexer 22 to select and output the first analog examining voltage to the ADC 24; (The ADC 24 transforms the first analog examining voltage into the second digital examining voltage.)

Step 108: The control unit 26 compares the second digital examining voltage with the first digital examining voltage. If a difference between the first digital examining voltage and the second digital examining voltage is smaller than a predetermined signal, then go to step 120, else go to step 130; (The difference between the first digital examining voltage and the second digital examining voltage being smaller than the predetermined signal represents that the first digital examining voltage output by the control unit 26 is almost equal to the second digital examining voltage, which is transformed from the first digital examining voltage sequentially by the second DAC 30, the multiplexer 22 and the ADC 24 and that the second DAC 30, the multiplexer 22 and the ADC 24 are all functioning normally. On the contrary, the difference between the first digital examining voltage and the second digital examining voltage being larger than the predetermined signal represents that at least one of the second DAC 30, the multiplexer 22 and the ADC 24 is functioning abnormally and that the monitor circuit 12 loses the capability to monitor the computer system 10 indefinitely.)

Step 120: Does the control unit 26 further output another digital examining voltage? If yes, then go to step 104, else go to step 190;

(The control unit 26 can further determine if the monitor circuit is indeed functioning normally by outputting another digital examining voltage. For example, the first digital examining voltage in step 108 can have a voltage level of 1V, while the digital examining voltage in step 120 can have a voltage level of 2V instead.)

Step 130: The control unit 26 controls the GPIO 36 to report that the monitor circuit 12 is functioning abnormally; and Step 190: End.

Although the method 100 cannot determine which one or more than one of the second DAC 30, the multiplexer 22 and the ADC is/are malfunctioning exactly, detecting the monitor circuit 12 malfunctioning and as unable to monitor the computer system 10 is certain and the computer system 10 will not be wrongly controlled by the damaged monitor circuit 12.

The method 200 comprises the following steps:

Step 202: Start;

Step 204: The control unit 26 controls the GPIO 36 to output a third counting clock according to a third fan count;

(The first fan speed counter 32 counts the third counting clock and outputs a fourth fan count.)

Step 206: The control unit 26 compares the fourth fan count with the third fan count. If a difference between the fourth fan count and the third fan count is smaller than a predetermined signal, then go to step 220. else go to step 230; (The difference between the fourth fan count and the third fan count being smaller than the predetermined signal represents that the third fan count output by the control unit 26 is almost equal to the fourth fan count transformed from the third fan count by the GPIO 36 and by the first fan speed counter 32 sequentially and that both of the GPIO 36 and the first fan speed counter 32 are functioning normally. On the contrary, the difference between the fourth fan count and the third fan count being larger than the predetermined signal represents that either the GPIO 36 or the first fan speed counter 32 or both are malfunctioning and that the monitor circuit 12 loses the capability to monitor the computer system 10.)

Step 220: Does the control unit 26 further control the GPIO 36 to output another counting clock according to another fan count? If yes, then go to step 204, else go to step 290; (The control unit 26 can further determine if the monitor circuit 12 is indeed functioning normally by controlling the GPIO 36 to output another counting clock according to another fan count.)

Step 230: The control unit 26 controls the GPIO 36 to report that the monitor circuit 12 is malfunctioning; and Step 290: End.

Likewise, although the method 200 cannot determine which one of the GPIO 36 and the first fan speed counter 32 of the monitor circuit 12 is malfunctioning, detecting the monitor circuit 12 malfunctioning and as unable to monitor the computer system 10 is certain and the computer system 10 will not be wrongly controlled by the damaged monitor circuit 12.

The computer system 10 can be a network system consisting of a server and a plurality of computers controlled by the server. When the server receives an abnormal signal indicating that the CPU 14 has too high a temperature from any of the computers, the server can output a corresponding control signal to increase the fan speed of the CPU fan 16 for example or even to shut off the computer according to the abnormal signal. The computer system 10 further comprises an alarm beeper and an alarm light formed by at least a light-emitting diode (LED). The alarm beeper and the alarm light have the capability to make sound and to emit light respectively to warn a user of the computer system 10 when the monitor circuit 12 detects that the computer system 10 has too high a temperature or unusual working voltages or that the monitor circuit 12 itself is malfunctioning. Moreover, in order to save usage of the pins, a monitor circuit of the present invention can further comprise a multiplexer controlled by the control unit 26 for selectively controlling the transference of the counting clock and the analog examining voltage.

In contrast to the prior art, the present invention can provide a monitor circuit having a control unit, a GPIO module, a fan speed counter, a multiplexer, an ADC, a DAC, a first conduction line connected between the GPIO and the fan speed counter, and a second conduction line connected between the DAC and the multiplexer. The control unit has the capability to control the GPIO to output a counting clock according to a fan count and to transfer the counting clock via the first conduction line to the fan speed counter, and to compare the fan count and another fan count transformed from the fan count by the fan speed counter and to determine if the monitor circuit is functioning normally. Additionally, the control unit has another capability to further output a digital examining voltage to the DAC and to control the multiplexer to transfer an analog examining voltage transformed from the digital examining voltage by the DAC and transmitted over the second conduction line to the ADC. The control unit then compares the digital examining voltage with a transformed digital examining voltage transformed from the digital examining voltage by the ADC and determines if the monitor circuit is functioning normally. The advantage of the present invention is that the monitor circuit has a self-error-examining capability. Therefore, a computer system including the monitor circuit has a reduced chance of being incorrectly controlled by a malfunctioning monitor circuit.

Following the detailed description of the present invention above, those skilled in the art will readily observe that numerous modifications and alterations of the device may be made while retaining the teachings of the invention. Accordingly, the above disclosure should be construed as limited only by the metes and bounds of the appended claims.

What is claimed is:

1. A method for examining a monitor circuit, the method comprising:
   (a) providing a computer system having at least a specific component capable of generating an input signal;
   (b) monitoring the input signal generated by the specific component of the computer system and generating a corresponding signal for comparing with a predetermined signal;
   (c) generating a compare signal with the monitor circuit according to the comparison resulted in step (b) and outputting a control signal for adjusting the operation of the specific component;
   (d) generating a first examining signal of the monitor circuit and generating a first corresponding signal for comparing with the predetermined signal;
   (e) generating a first compare signal according to the comparison result of step (d) and outputting a first input signal;
   (f) monitoring the first input signal with the monitor circuit and generating a second examining signal; and
   (g) comparing the first examining signal and the second examining signal and determining if the monitor circuit is functioning normally.

2. The method of claim 1, wherein the input signal is a voltage signal.

3. The method of claim 1, wherein the input signal is a temperature signal.

4. The method of claim 1, wherein the input signal is a fan speed signal.

5. The method of claim 1 further comprising:
   (h) inputting the output signal to a multiplexer.

6. A monitor circuit comprising:
   a first detection module for detecting an input signal and for generating a first examining signal according to the input signal;
   a second detection module electrically connected to the first detection module for generating an output signal according to the first examining signal; and
   a control unit electrically connected to the first and the second detection modules selectively for controlling the second detection module to generate the output signal according to the first examining signal, for controlling the first detection module to monitor the output and to generate a second examining signal, and for comparing the first examining signal with the second examining signal so as to determine if the monitor circuit is functioning normally.

7. The monitor circuit of claim 6, wherein the input signal is a temperature signal, and the first detection module comprises:
   a transducer for detecting the temperature signal and for transforming the temperature signal into an analog voltage signal; and
   an analog to digital converter (ADC) for transforming the analog voltage signal into the first examining signal.

8. The monitor circuit of claim 6, wherein the input signal is the fan speed signal, the first detection module is a tachometer for detecting the fan speed signal and for transforming the fan speed signal into the first examining signal, and the second detection module is a general purpose input/output module (GPIO) for generating the fan speed signal according to the first examining signal.

9. The monitor circuit of claim 6 further comprising a multiplexer, the output signal outputted from the second detection module being inputted to the multiplexer.

10. A computer system comprising:
    a specific component; and
    a monitor circuit for monitoring the operation of the specific component, the monitor circuit comprising:
    a first detection module for examining an input signal generated by the specific component and for generating a first examining signal according to the input signal;
    a second detection module electrically connected to the first detection module for generating an output signal according to the first examining signal; and
    a control unit electrically connected to the first and the second detection modules selectively for controlling the second detection module to generate the output signal according to the first examining signal, for controlling the first detection module to monitor the output and to generate a second examining signal, or for comparing the first examining signal with the second examining signal so as to determine if the monitor circuit is functioning normally.

11. The computer system of claim 10, wherein the input signal generated by the specific component is a temperature signal, and the first detection module comprises:
    a transducer for detecting the temperature signal and for transforming the temperature signal into an analog voltage signal; and
    an ADC for transforming the analog voltage signal into the first examining signal.

12. The computer system of claim 10, wherein the specific component is a central processing unit (CPU).

13. The computer system of claim 10, wherein the input signal generated by the specific component is the fan speed signal, the first detection module is a tachometer for examining the fan speed signal and for transforming the fan speed signal into the first examining signal, and the second detection module is a general purpose input/output module (GPIO) for generating the fan speed signal according to the first examining signal.

14. The computer system of claim 10, wherein the specific component is a fan.

15. The computer system of claim 10 further comprising a multiplexer, the output signal outputted from the second detection module being inputted to the multiplexer.

* * * * *